United States Patent [19]

Oguro et al.

[11] Patent Number: 5,159,500
[45] Date of Patent: Oct. 27, 1992

[54] MAGNETIC TAPE RECORDING OF REPRODUCING APPARATUS WITH RECORDED CHANNEL INDICATOR

[75] Inventors: Masaki Oguro, Tokyo; Hajime Kawakami; Shunji Motohashi, both of Kanagawa; Shinichi Fukushima; Masahiro Negamune, both of Tokyo, all of Japan

[73] Assignee: Sony Corporation, Japan

[21] Appl. No.: 428,445

[22] Filed: Oct. 30, 1989

Related U.S. Application Data

[63] Continuation of Ser. No. 869,309, Jun. 2, 1986, abandoned.

[30] Foreign Application Priority Data

Jun. 13, 1985 [JP] Japan .............................. 60-89271[U]

[51] Int. Cl.⁵ ............................ G11B 5/02; G11B 5/58
[52] U.S. Cl. ............................ 360/19.1; 360/77.15; 360/137; 360/27
[58] Field of Search ................. 340/753, 754; 360/137, 360/72.2, 19.1, 27, 18, 32, 77.14, 77.15

[56] References Cited

U.S. PATENT DOCUMENTS

| | | | |
|---|---|---|---|
| 2,550,007 | 4/1951 | Fedor | 179/100.3 |
| 3,279,799 | 10/1966 | Proctor | 274/11 |
| 3,588,375 | 6/1971 | Martin | 179/100.2 |
| 3,647,986 | 3/1972 | Lace et al. | 179/100.2 |
| 4,051,540 | 9/1977 | Wilder et al. | 360/72.2 X |
| 4,130,842 | 12/1978 | Gallo et al. | 360/35 |
| 4,325,080 | 4/1982 | Satoh | 358/127 |
| 4,433,347 | 2/1984 | Sugiyama et al. | 360/97 X |
| 4,542,418 | 9/1985 | Yoneyama et al. | 360/64 X |
| 4,542,419 | 9/1985 | Morio et al. | 358/343 X |
| 4,577,252 | 3/1986 | Kobayashi | 360/137 |
| 4,583,132 | 4/1986 | Nakano et al. | 358/343 X |
| 4,958,246 | 9/1990 | Kozuki et al. | 360/18 X |

FOREIGN PATENT DOCUMENTS

| | | |
|---|---|---|
| 0893359 | 2/1972 | Canada. |
| 0081958 | 6/1982 | European Pat. Off.. |
| 0085578 | 2/1983 | European Pat. Off.. |

Primary Examiner—Andrew L. Sniezek
Attorney, Agent, or Firm—Ronald P. Kananen

[57] ABSTRACT

A recording and/or reproducing apparatus selectively performs video recording and audio recording on a common magnetic tape. In an audio recording mode, the video recording area used to record video signals in a video recording mode is divided into a plurality of segments serving as audio recording channels. The recording and/or reproducing apparatus is provided with a recorded channel detector and an indicator including a plurality of indicator segments, each of which corresponds to one audio recording channel. The detector produces a detector signal representing that the current channel is pre-recorded. The indicator segments are responsive to the detector signals from the recorded channel detector to turn ON to indicate that the corresponding audio recording channel is occupied. This arrangement facilitates channel selection for the audio recorder by simply monitoring the indicator. In order to detect pre-recorded channels, it is most convenient to scan a pilot signal superimposed on the audio signal and recorded on the corresponding channel. Therefore, the recorded channel detector can scan the tape and produce detector signals by referring to the pilot signal.

20 Claims, 3 Drawing Sheets

MAGNETIC TAPE RECORDING OF REPRODUCING APPARATUS WITH RECORDED CHANNEL INDICATOR

This application is a continuation of application Ser. No. 06/869,309, filed Jan. 2, 1986 now abandoned.

BACKGROUND OF THE INVENTION

The present invention relates to a helical-scan-type magnetic tape recording and/or reproducing apparatus. More specifically, the invention relates to a magnetic tape recording and/or reproducing apparatus which can function as a video tape recorder or as an audio tape recorder utilizing a common magnetic tape. Still more particularly, the invention relates to a multi-channel magnetic tape recording and/or reproducing apparatus with an indicator for the recorded channel.

U.S. Pat. No. 4,542,419, issued to Minoru MORIO et al., on Sep. 17, 1985 discloses a helical-scan magnetic tape recording and/or reproducing apparatus which can operate either as a video tape recorder or as an audio tape recorder, such as a pulse-code-modulated (PCM) audio signal recorder. In this type of recording and/or reproducing apparatus, a magnetic tape is wrapped around a rotary head drum at an angle relative to the magnetic head path so as to define video and audio recording areas on the tape. In a normal video recording mode, the recording and/or reproducing apparatus records or reproduces a PCM audio signal on the audio recording area, in which the PCM audio signal is to be recorded by time-base compression. On the other hand, in an audio recording mode, the recording and/or reproducing apparatus uses not only the audio recording area but also the video recording area for PCM audio signal recording. In the latter case, the video recording area is divided into a plurality of segments, each of which corresponds to the audio recording area and records time-base-compressed PCM audio signals in substantially the same format as is recorded in the audio recording area.

With this arrangement, a plurality of PCM audio signal recording channels are formed on the magnetic tape. In the normal VTR tape recorder, each recording track is divided into the video recording area and the audio recording area respectively covering 180° and 36° of rotary head drum rotation. When the recording and/or reproducing apparatus is operating in a PCM audio recording mode, the video recording area is divided into 5 segments, each corresponding to 36° of rotary head drum rotation. The segments on the track form a sequence of channels for PCM audio recording. Therefore, in the aforementioned example, 6 channels are formed on the magnetic tape. Normally, a single channel is used for one cycle of PCM audio signal recording. Therefore, 6 cycles of PCM audio recording can be performed on a single magnetic tape.

On tapes on which some PCM audio recording has been performed, the channel available for the next audio recording, i.e., a blank channel, must be selected for a next cycle of PCM audio recording by the recording and/or reproducing apparatus. On the other hand, when the recorded PCM audio signal is to be reproduced, the channel corresponding to the desired program must be selected.

A difficulty is encountered in prior proposed systems in selecting the channel for the next cycle of audio signal recording, since there is no way to distinguish between pre-recorded channels and unused channels except by reproducing each channel. This is not at all convenient for utilizing the recording and/or reproducing apparatus in an audio recording mode.

SUMMARY OF THE INVENTION

Therefore, it is an object of the present invention to provide a recording and/or reproducing apparatus which has an indicator for pre-recorded channels which thus also indicates which channels are available for audio signal recording.

In order to accomplish the aforementioned and other objects, a recording and/or reproducing apparatus, according to the present invention, selectively performs video recording and audio recording on a common magnetic tape. In an audio recording mode, the video recording mode is divided into a plurality of segments serving as audio recording channels. The recording and/or reproducing apparatus is provided with a recorded channel detector and an indicator including a plurality of indicator segments, each of which corresponds to one audio recording channel. The indicator segments are responsive to the detector signals from the recorded channel detector to turn ON to indicate that the corresponding audio recording channel is in operation. This arrangement facilitates channel selection for the audio recorder, since channel selection is achieved by simply monitoring the indicator.

In order to detect pre-recorded channels, it is most convenient to scan a pilot signal superimposed on the audio signal and recorded on the corresponding channel. Therefore, the recorded channel detector can scan the tape and produce detector signals by referring to the pilot signal.

According to one aspect of the present invention, a magnetic tape recording and/or reproducing apparatus has a display apparatus which comprises a display device having a first set of display segments each corresponding to one of a plurality of audio recording channels on a magnetic tape; a pilot signal reproducing circuit means for reproducing a pilot signal superimposed on audio data recorded on skewed tracks of the magnetic tape; first logic circuit means supplied with said reproduced pilot signal and a timing signal for generating indication signals representing pre-recorded channels; and drive circuit means for supplying the indication signals to the first set of display segments. In practice, the recording and/or reproducing apparatus is of the helical-scan type and the aforementioned plurality of channels are defined as segments of each skewed track.

Preferably, the display apparatus further comprises a second set of display segments, each corresponding to one of the channels, for displaying a selected one of the channels. The second set of segments is controlled by a second logic circuit means which receives a select signal identifying one of the channels. In the preferred construction, the display apparatus further comprises a third logic circuit means which receives tuning information and drives a selected one of the second set of display segments.

BRIEF DESCRIPTION OF THE DRAWINGS

The present invention will be understood more fully from the detailed description given herebelow and from the accompanying drawings of the preferred embodiment of the present invention, which, however, should not be taken to limit the invention to the specific embodiment, but are for explanation and understanding only.

In the drawings.

DESCRIPTION OF THE PREFERRED EMBODIMENT

General techniques and circuitry for selectively performing normal VTR operations and PCM audio recording operations have been disclosed in the aforementioned U.S. Pat. No. 4,542,419 to Morio et al. and assigned to the assignee of the present invention. The contents of the aforementioned U.S. Pat. No. 4,542,419 are hereby incorporated by reference for the sake of disclosure.

Figure 1:
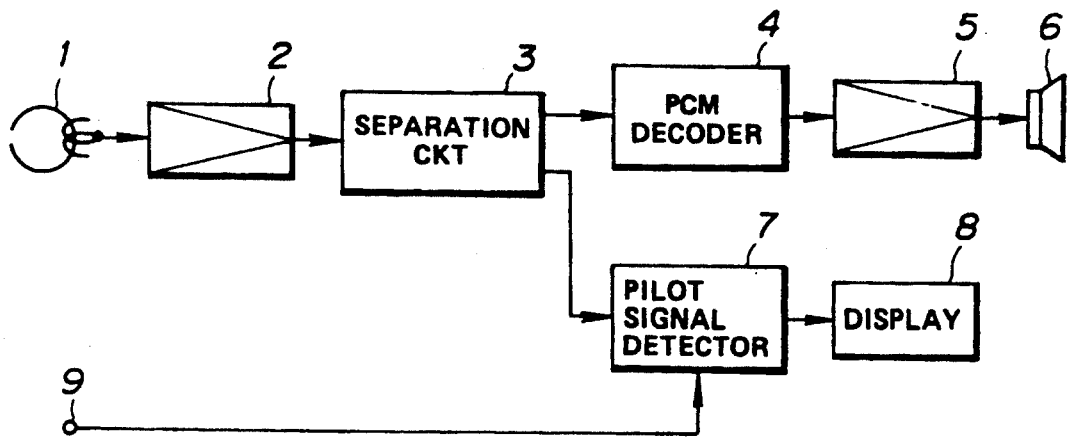
FIG. 1 is a block diagram of the preferred embodiment of a recording and/or reproducing apparatus according to the invention, in which are illustrated only those components necessary for audio (PCM audio) recording.
Figure 2A:
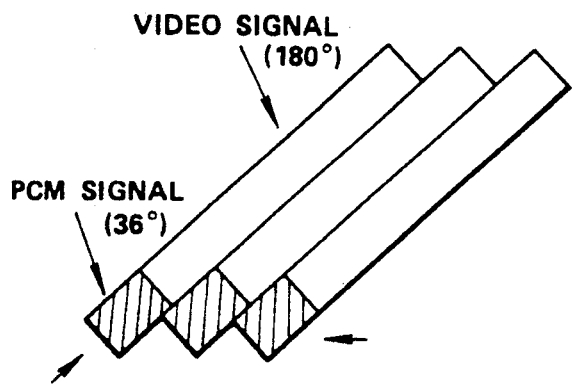
FIGS. 2(A) and 2(B) are diagrams of the structure of the magnetic tape tracks in a video recording mode and an audio recording mode respectively.
Figure 2B:
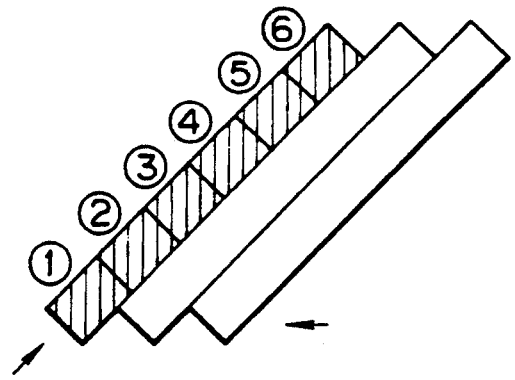

Referring now to the drawings, and particularly to FIGS. 1 and 2, a rotary magnetic head 1 of the preferred embodiment of a recording and/or reproducing apparatus picks up video and/or audio signals recorded on the tracks on a magnetic tape, e.g. VTR tape. As is well known, the PCM audio signal is superimposed on a pilot signal with a fixed frequency, e.g. 228.748 kHz.

Figure 4:
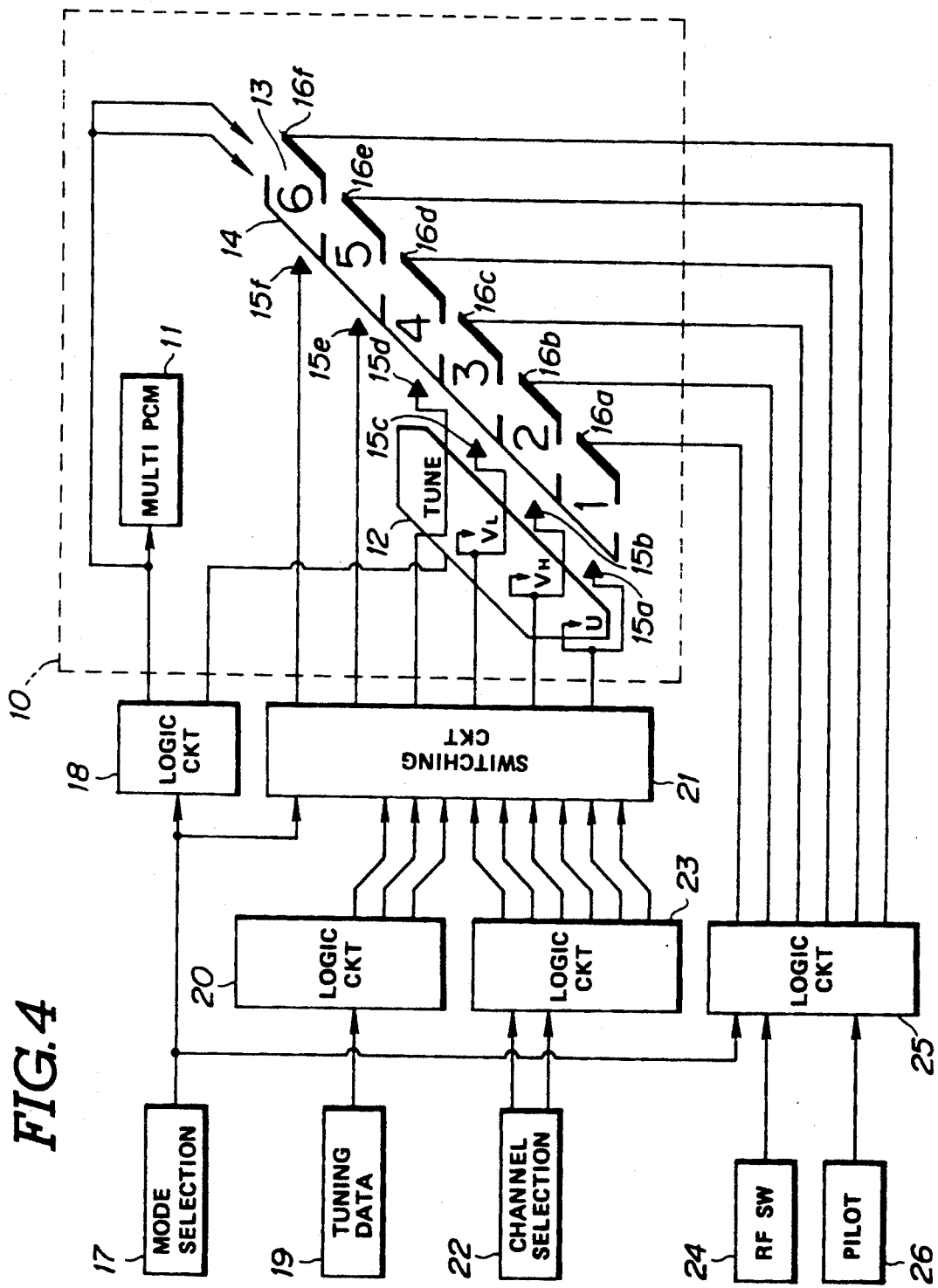
FIG. 4 is a detailed block diagram of the indicator control circuitry of the recording and/or reproducing apparatus of FIG. 1.
Figure 5:
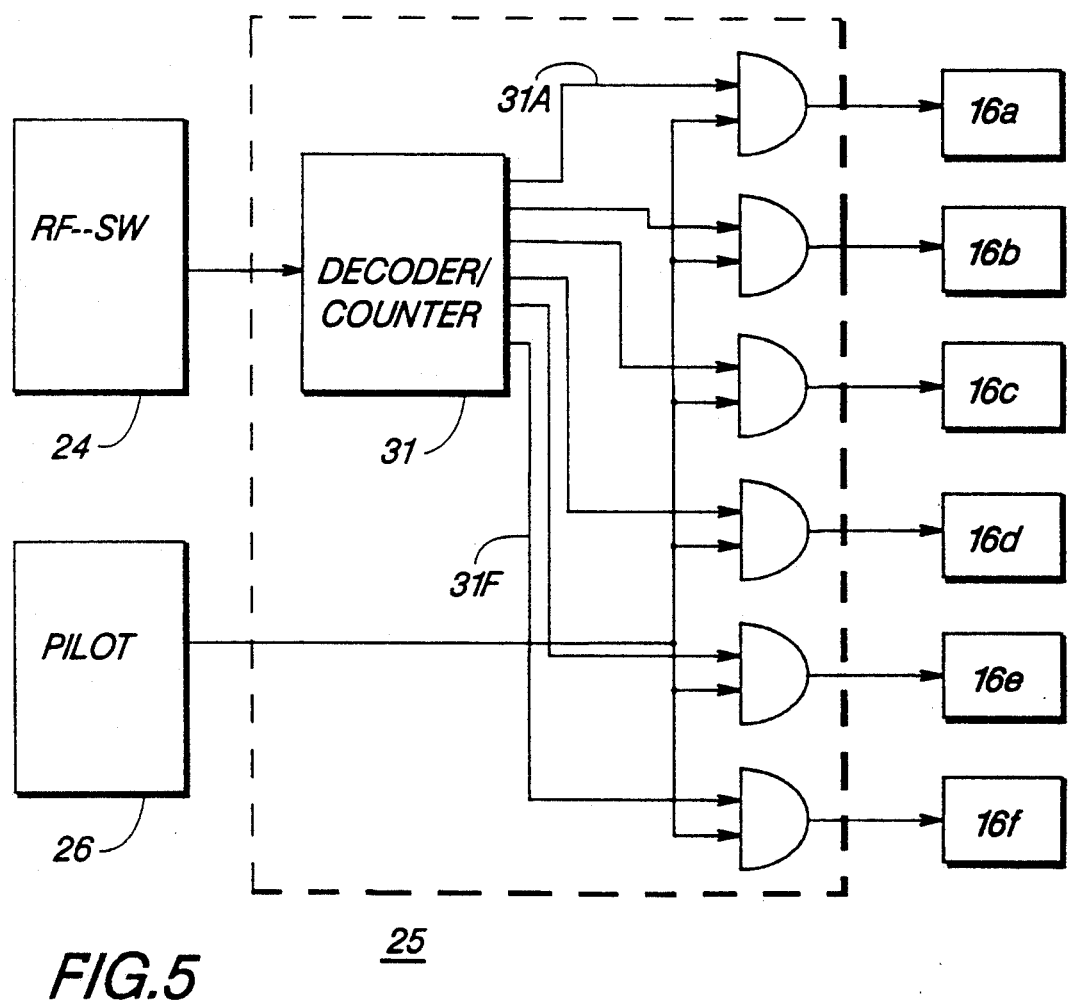
FIG. 5 is block diagram of the pilot signal detector 25 of FIG. 4.

FIG. 5 shows a circuit for implementing at least in part the logic circuit 25 of FIG. 4. The RF-SW pulses are received by for instance a counter 31 having a plurality of outputs 31a to 31f, one for each of the channels. The counter 31 is reset to count value zero at the beginning of scanning of each track by one of the two heads of the recorder, and counts up to 6 before being reset. Each one of the outputs 31a to 31f is raised to a high logic level for a respective count value, corresponding to the six channels in the track.

These outputs 31a to 31f are respectively provided as first inputs to six AND gates 32a to 32f. The pilot signals 26 is provided as a second input to all the AND gates in parallel. Depending on the presence of a signal on the two inputs of each AND gate, the corresponding channel indicator segment 16a to 16f is activated, to indicate whether or not there is recorded data on any of the six channels on the respective part of the tape being scanned at that time by the first head. This and other approaches for implementing the logic circuit 25 of FIG. 4 is immediately apparent to a skilled worker in the art from the above descriptions, including the admitted prior art of MORIO et al. incorporated by reference in the first part of this specification.

The PCM audio signal picked up by the magnetic head 1 is amplified by an amplifier 2 and output to a separation circuit 3. The separation circuit 3 separates the amplified signal into a PCM signal component and a pilot signal component.

The PCM audio signal output from the separation circuit 3 is fed to a PCM decoder 4 which demodulates the separated PCM audio signal. The demodulated digital signal is then converted into analog signals to be reproduced through an amplifier 5 and a speaker 6, as is well known in the art.

On the other hand, the separated pilot signal component output by the separation circuit 3 is fed to a pilot signal detector 7. The pilot signal detector 7 also receives a RF-SW signal through a terminal 9. Based on the RF-SW signal, the pilot signal detector 7 recognizes which channel corresponds to the reproduced PCM audio signal and outputs a driver signal to a display 8.

The display 8 has a plurality of indicator segments, each of which respectively corresponds to one channel on the magnetic tape. Each indicator segment is designed to be illuminated by the driver signal produced by the pilot signal detector 7 in response to the pilot signal of the corresponding channel. Therefore, each indicator segment is turned on in response to the pilot signal reproduced from the corresponding channel on the magnetic tape.

Figure 3:
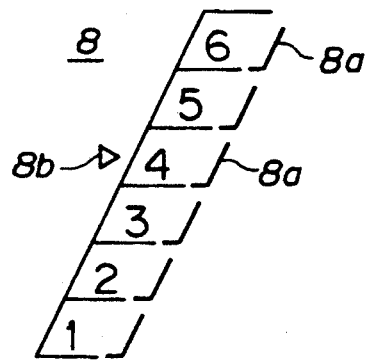
FIG. 3 is an illustration of an indicator employed in the preferred embodiment of the recording and/or reproducing apparatus.

FIGS. 2 and 3 illustrate the relationship between the display 8 employed in the preferred embodiment and the track structure of the magnetic tape. As set forth above, since the normal VTR tape consists of six channels when used for PCM audio recording, the display 8 is composed of six display sections, each corresponding to one of the channels. For instance, the section labeled "1" corresponds to the first channel on the magnetic tape, and the section labeled "2" corresponds to the second channel. Similarly, the sections labeled "3", "4", "5" and "6" respectively correspond to the third to sixth channels. As illustrated in FIG. 3, the indicator segments 8a are arranged in corresponding sections of the display 8.

As will be seen from FIG. 3, each indicator segment 8a is an _/-shaped LED segment which turns on in response to the driver signal from the pilot signal detector. Therefore, in the condition shown in Fig. 2(B), all six channels are already pre-recorded.

The display 8 may also include a selected position indicator 8b. In the shown embodiment, the selected position indicator 8b is a triangular LED segment pointing toward the channel being reproduced. In FIG. 3, the selected position indicator 8b indicates the fourth channel.

The preferred embodiment of the channel indication display circuit 8 for the recording and/or reproducing apparatus according to the present invention will be described in greater detail below with reference to FIG. 4. In this embodiment, the channel indicator display circuit uses the same circuit elements as a tuner display circuit.

In FIG. 4, the reference numeral 10 denotes a portion of a multi-purpose display mounted on a front panel (not shown) of a VTR housing. The multi-purpose display 10 has mode display sections 11 and 12. The mode display sections 11 and 12 are each connected to a logic circuit 18 which controls the mode display sections according to a mode selection signal input from a mode selection terminal 17. The logic circuit 18 thus decodes the mode selection signal from the mode selection terminal 17.

In practice, a signal at the mode selection terminal 17 allows selection of either a multi-PCM mode or a tuning mode. When the multi-PCM mode is selected, PCM audio recording and/or reproduction is performed. On the other hand, when the tuning mode is selected, television channel tuning in normal VTR operation is performed. The mode display section 11 is turned on when the multi-PCM mode is selected and the mode display section 12 is turned on when the tuning mode is selected.

In the multi-PCM mode, all of the numerical indicators 13 and frame segments 14 turn on at the same time when the mode display section 11 is turned on.

The multi-purpose display 10 is also provided with triangular channel position indicator segments 15a to 15f and ⌐-shaped channel indicator segments 16a to 16f. The channel position indicator segments 15a to 15f are arranged respectively opposite corresponding numerical indicators 13. The channel indicator segments 16a to 16f are arranged at the side of the numerical indicators 13 opposite from the selected position indicators 15a to 15f.

In the tuning mode, tuning data from a tuning data input terminal 19 is input to a logic circuit 20. The logic circuit 20 derives an output representing a selected television channel band. Specifically, the tuning data contains selected channel data indicating one of the low VHF band, the high-VHF band or the UHF band. Therefore, the mode display section 12 includes indicator segments $V_L$, $V_H$ and U respectively corresponding to the low VHF band, the high-VHF band and the UHF band. One of these indicator segments turns on in response to the tuning data input from the tuning data input terminal 19.

A switching circuit 21 is provided between the logic circuit 20 and the selected position indicator segments 15a to 15f. The switching circuit 21 receives the output of the logic circuit 20 and also receives the output of a logic circuit 23 which receives channel selection data through a channel selection data input terminal 22. The logic circuit 23 thus outputs a switching signal which is derived from the channel selection data input from the channel selection data input terminal 22. The switching signal of the logic circuit 23 is output to the switching circuit 21, which selectively turns on one of the selected position indicator segments 15a to 15f corresponding to the selected channel.

In addition, there is provided another logic circuit 25. The logic circuit 25 receives a RF-SW pulse through a terminal 24. The logic circuit 25 also receives the pilot signal through a terminal 26. The output terminals of the logic circuit 25 are connected to the recorded channel indicator segments 16a to 16f. The logic circuit 25 also receives the mode selection data from the mode selection terminal 17. When the mode selection data indicates that the tuning mode has been selected, the logic circuit 25 is disabled.

In the multi-PCM mode, the logic circuit 25 is active to compare the timing of occurrences of the pilot signal with the RF-SW pulses. The timing of occurrences of the pilot signal indicates to the logic circuit 25 which channels have been pre-recorded. Each time the pilot signal is detected, the logic circuit outputs a drive signal to the channel indicator segment 16a to 16f corresponding to the current channel so as to turn on that indicator segment.

As set forth above, according to the invention, the present invention can provide a visual indication of pre-recorded tracks by detecting the pilot signal superimposed on PCM audio data. This allows the user to find channels available for recording without having to reproduce acoustic sounds. This also prevents the user from erroneously erasing recorded data by overwriting it with the new PCM audio data. Furthermore, when no acoustic sound is being generated during playback, the user can check whether the silence is due to an empty channel or to the muting interval between recorded programs. In addition, the present invention allows the user to quickly locate a desired song or program utilizing the picture search function of the VTR.

Therefore, the present invention fulfills all of the objects and advantages sought therefor.

While a specific embodiment has been disclosed in order to facilitate full understanding of the invention, the shown embodiment is a mere example of implementation of the present invention. The present invention can be embodied in various ways. Therefore, it should be understood that the present invention includes all possible embodiments and modifications to the embodiments which can be embodied without departing from the principle of the invention set out in the appended claims.

What is claimed is:

1. A recording status display apparatus for a multi-PCM recorder for a plurality of recording channels each distributed as respective parts of a plurality of recording tracks on a magnetic tape, said recorder being operable in a multi-PCM made and in a tuning mode, wherein PCM data to be recorded in each selected one of said recording channels is provided superposed on a pilot signal to said respective parts of said recording tracks in a sequential manner, said apparatus comprising, for operation with said recorder in said multi-PCM mode:

a display device having a first set of display segments, said first set including a plurality of said display segments, each said display segment corresponding to a different one of said recording channels;

a timing signal generator for generating a timing signal to be used for identifying each one of said recording channels a segment of which is currently being scanned, while said multi-PCM recorder scans sequentially said recording tracks;

a signal separation circuit means for separating and reproducing the pilot signal from said superposed PCM data in each of said channels in which said data is recorded while said recorder sequentially scans said recording tracks;

a first logic circuit means responsive to said reproduced pilot signal and said timing signal for generating indication signals representing which of said recording channels have any of said PCM data already recorded therein; and a drive circuit means for supplying said indication signals to said first set of display segments to indicate on said display device which ones of said recording channels have any of said PCM data recorded therein.

2. A display apparatus as set forth in claim 1, wherein:
said display device is operative under the conditions that each said recording track comprises a skewed track on a helical-scan-type magnetic tape, each said skewed track being oriented at an angle with respect to a direction of advancement of said tape;
each said skewed track is divided into a successive plurality of said segments; and
each said part of each said recording channel comprises the same respective segment in each said skewed track.

3. A display apparatus as set forth in claim 2, wherein:
said display device includes a second set of display segments, each said display segment of said second set corresponding to a respective one of said channels; and said display segments of said second set indicate which one of said channels is currently selected for recording or reproduction of said PCM data.

4. A display apparatus as set forth in claim 3, comprising a second logic circuit means which:

receives a selection signal initiated by a user to indicate which of said channels is currently selected; and controls said second set of display segments in accordance with said selection signal to provide a display indicating which one of said channels to currently selected, by driving the respective one of said display elements of said second set corresponding to the currently selected channel.

5. A recording status display apparatus for a multi-PCM recorder for a plurality of recording channels each distributed as respective parts of a plurality of recording tracks on a magnetic tape, said recorder being operable in a multi-PCM mode and in a tuning mode, wherein PCM data to be recorded in each selected one of said recording channels is provided superposed on a pilot signal to said respective parts of said recording tracks in a sequential manner, said apparatus comprising, for operation with said recorder in said multi-PCM mode;

a display device having a first set of display segments, said first set including a plurality of said display segments, each said display segment corresponding to a different one of said recording channels, wherein said display device is operative under the conditions that each said recording track comprises a skewed track on a helical-scan-type magnetic tape, each said skewed track being oriented at an angle with respect to a direction of advancement of said tape, each said skewed track is divided into a successive plurality of said segments; and each said part of each said recording channel comprises the same respective segment in each said skewed track, and wherein said display device includes a second set of display segments, each said display segment of said second set corresponding to a respective one of said channels, and said display segments of said second set indicate which one of said channels is currently selected for recording or reproduction of said PCM data;

a timing signal generator for generating a timing signal to be used for identifying each one of said recording channels a segment of which is currently being scanned, while said multi-PCM recorder scans sequentially said recording tracks;

a signal separation circuit means for separating and reproducing the pilot signal from said superposed PCM data in each of said channels in which said data is recorded while said recorder sequentially scans said recording tracks;

a first logic circuit means responsive to said produced pilot signal and said timing signal for generating indication signals representing which of said recording channels have any of said PCM data already recorded therein;

a second logic circuit means which receives a selection signal initiated by a user to indicate which of said channels is currently selected, and controls said second set of display segments in accordance with said selection signal to provide a display indicating which one of said channels is currently selected, by driving the respective one of said display elements of said second set corresponding to the currently selected channel; and a drive circuit means for supplying said indication signals to said first set of display segments to indicate on said display device which ones of said recording channels have any of said PCM data recorded therein; and further comprising, for operation with said recorder in said tuning mode;

said second set of display segments including additional display segments which are respectively associated with corresponding different types of tuning signals to be recorded in a selected one of said channels, and a third logic means which receives information indicating said type of said tuning signal to be recorded and drives, while said recorder is in said tuning mode, the respective one of said additional display segments of said second set, to provide a display of the type of said tuning signal to be recorded.

6. A recording status display apparatus, for providing an indication of each pre-recorded channel on a magnetic tape of a multi-PCM recorder which handles a plurality of the channels distributed in respective parts of sequential recording tracks on the magnetic tape, wherein PCM data to be recorded in each said channel is provided superposed on a pilot signal to each said respective part of said recording tracks in a sequential manner, said recorder being operable in a multi-PCM mode and in a tuning mode, said recorder providing a timing signal corresponding to each said channel when scanning each track in said multi-PCM mode, said apparatus comprising, for operation with said recorder in said multi-PCM mode;

a display means comprising a plurality of first display segments equal in number to the number of said channels, each said first display segment respectively corresponding to a different one of said channels; and a first logic means respective to said pilot signal recorded with said PCM data in each said channel on said magnetic tape and to said timing signal to correlate said pilot signal with each respective recorded channel on said magnetic tape to produce a respective drive signal to each respective one of said first display segments of said display means corresponding to each said pre-recorded channel to identify on said display means each said channel having any of said PCM data already recorded therein.

7. An apparatus as set forth in claim 6, further including means for disabling said first logic means when said apparatus is in said tuning mode.

8. An apparatus as set forth in claim 6, further including;

a pilot signal input means for providing said pilot signal from each said pre-recorded channel to said first logic means; and a RF-SW input means for providing said timing signal as an RF-SW signal as an input to said first logic means for correlating the occurrences of said pilot signal with the RF-SW signal, thereby to produce each said drive signal representing each said channel having any of said PCM data pre-recorded therein.

9. An apparatus as set forth in claim 6, wherein:

said display means includes a plurality of numeral indicators for individually representing channels; and a plurality of channel position indicator segments respectively corresponding to and responsive to a channel selected by an operator and said first display segments respectively arranged opposite said numeral indicators, said first display segments thus serving as channel indicator segments;

whereby each said drive signal of said first logic means activates a corresponding channel indicator segment when the respective channel has been pre-recorded with any of said PCM data.

10. An apparatus as set forth in claim 9, said recorder being operable to provide a channel selection signal responsive to the selection of one of said channels by an operator, said apparatus further including:

a second logic means responsive to said channel selection signal to provide a corresponding output; and a switching circuit receiving each said output from said second logic means, for activating the respective one of said channel position indicator segments corresponding to the channel selected by the operator.

11. A recording status display apparatus for a recording/reproducing device which selectively records or reproduce data from a plurality of recording channels each distributed into plural tracks on a recording magnetic medium, each of said plurality of recording channels comprising a plurality of segments on each said track for sequentially receiving data thereon, each said segment with said data recorded thereon having also a pilot signal recorded thereon for indicating the presence of such recorded data on said segment, said apparatus comprising:

a display device having a first set of display segments for displaying indicia corresponding to each of said plurality of channels;

a timing signal generator for generating a timing signal to be used for identifying each of said recording channels;

a pilot signal reproducing circuit means for reproducing the pilot signal recorded with said data on each of said recording channels;

a logic circuit means responsive to said reproduced pilot signal and said timing signal for generating indication signals representing pre-recorded recording channels from among said recording channels; and a drive circuit means for supplying said indication signals to said first set of display segments in order to indicate on said display device which of said recording channels have any of said data recorded thereon.

12. An apparatus comprising:

recording means for being operated in a first mode for 1) recording data on any selected channel of a plurality of channels, each said channel comprising a sequence of respective segments from each of a plurality of sequential tracks on a magnetic recording medium, each said track including a number of said segments equal to the number of said plurality of channels, wherein a pilot signal is superposed with said data for the recording thereof in each respective one of said segments, and 2) scanning said tracks on said tape with each said recorded segment thereof, while detecting said pilot signal from each said segment of each said channel in which said data is recorded and generating a timing signal for indicating which one of said channels corresponds to the one of said segments that is currently being scanned, and generating from each said detected pilot signal and said timing signal a recorded-channel indication signal indicating that the respective part of the respective channel has said data recorded therein; and display means operable in said first mode for receiving during said scanning of said tape each said recorded-channel indication signal, and for providing a corresponding display uniquely identifying each said channel having said data recorded in said respective parts being scanned.

13. The apparatus of claim 12, wherein:

said recording means further includes means for generating a timing signal for indicating which segments of each said track are currently being scanned; and the generating of each said recorded-channel indication signal is performed by said recording means on the basis of comparison of the timing of the timing signal and each said detected pilot signal.

14. The apparatus of claim 13, wherein:

said recording means is operable in a second mode to record a first sequence of said data in a first one of said channels, namely in one respective segment of each said track, and to simultaneously record further data in all the other segments of each said track, in the manner that said all other segments constitute a single enlarged segment and the sequence of enlarged segments in sequential tracks constitutes a single enlarged channel for said further data; and each said unique identification of each said channel during said first mode is disabled during operation in said second mode.

15. The apparatus of claim 12, comprising:

said recording means including selection means for an operator to select one of said channels for recording said data thereon and to provide a corresponding output signal; and said display means for receiving said output signal from said recording means and for providing a corresponding display uniquely identifying the selected channel.

16. The apparatus of claim 15, wherein:

said recording means is operable in a second mode to record a first sequence of said data in a first one of said channels, namely in one respective segment of each said track, and to simultaneously record further data in all the other segments of each said track, in the manner that said all other segments constitute a single enlarged segment and the sequence of enlarged segments in sequential tracks constitutes a single enlarged channel for said further data; and each said unique identification of each said channel during said first mode is disabled during operation in said second mode.

17. The apparatus of claim 12, wherein:

said recording means is operable in a second mode to record a first sequence of said data in a first one of said channels, namely in one respective segment of each said track, and to simultaneously record further data in all the other segments of each said track, in the manner that said all other segments constitute a single enlarged segment and the sequence of enlarged segments in sequential tracks constitutes a single enlarged channel for said further data; and each said unique identification of each said channel during said first mode is disabled during operation in said second mode.

18. An apparatus, comprising:

recording means for being operated in a first mode for 1) recording data on any selected channel of a plurality of channels, each said channel comprising a sequence of respective segments from each of a plurality of sequential tracks on a magnetic tape recording medium, each said track including a number of said segments equal to the number of said plurality of channels, wherein a pilot signal is superposed with said data for the recording thereof in each respective one of said segments, and 21 scanning said tracks on said tape with each said recorded segment thereof, while detecting said pilot signal from each said segment of each said channel in which said data is recorded and generating a timing signal for indicating which one of said channels corresponds to the one of said segments that is currently being scanned, and generating from each said detected pilot signal and said timing signal a recorded-channel indication signal indicating that the respective part of the respective channel has said data recorded therein; and wherein said recording means is operable in a second mode to record a first sequence of said data in a first one of said channels, namely in one respective segment of each said track, and to simultaneously record further data in all the other segments of each said track, in the manner that said all other segments constitute a single enlarged segment and the sequence of enlarged segments in sequential tracks constitutes a single enlarged channel for said further data;

display means operable in said first mode for receiving during said scanning of said tape each said recorded-channel indication signal, and for providing a corresponding display uniquely identifying each said channel having said data recorded in said respective parts being scanned, wherein each said unique identification of each said channel during said first mode is disabled during operation in said second mode; and said recording means comprising means for classifying said further data into one of a predetermined plurality of classes and outputting a corresponding classification signal; and said display means comprising means for receiving said classification signal and providing a corresponding display identifying said class of said further data.

19. An apparatus, comprising:

recording means for being operated in a first mode for 1) recording data on any selected channel of a plurality of channels, each said channel comprising a sequence of respective segments for each of a plurality of sequential tracks on a magnetic tape recording medium, each said track including a number of said segments equal to the number of said plurality of channels, wherein a pilot signal is superposed with said data for the recording thereof in each respective one of said segments, and 2) scanning said tracks on said tape with each said recorded segment thereof, while detecting said pilot signal from each said segment of each said channel in which data is recorded, and generating a timing signal for indicating which one of said channels corresponds to the one of said segments that is currently being scanned, and generating from each said detected pilot signal and said timing signal a recorded-channel indication signal indicating that the respective part of the respective channel has said data recorded therein; and display means operable in said first mode for receiving during said scanning of said tape each said recorded-channel indication signal, and for providing a corresponding display uniquely identifying each said channel having said data recorded in said respective parts being scanned; and wherein said recording means includes means for generating a timing signal for indicating which segments of each said track are currently being scanned; and said generating of each said recorded-channel indication signal is performed on the basis of comparison of the timing of the timing signal and each said detected pilot signal; and wherein said recording means is operable in a second mode to record a first sequence of said data in a first one of said channels, namely in one respective segment of each said track, and to simultaneously record further data in all the other segments of each said track, in the manner that said all other segments constitute a single enlarged segment and the sequence of enlarged segments in sequential tracks constitutes a single enlarged channel for said further data; and each said unique identification of each said channel during said first mode is disabled during operation in said second mode; and said recording means comprising means for classifying said further data into one of a predetermined plurality of classes and outputting a corresponding classification signal; and said display means comprising means for receiving said classification signal and providing a corresponding display identifying said class of said further data.

20. A recording status display apparatus for a multi-PCM recorder for a plurality of recording channels each distributed as respective parts of one slantly-formed recording track on amagnetic tape, said recorder being operable in a multi-PCM mode and in a tuning mode, wherein PCM data to be recorded in each selected one of said recording channels is provided superposed on a pilot signal to said respective parts of said recording track in a sequential manner, said apparatus comprising, for operation with said recorder in said multi-PCM mode:

a display device having a first set of display segments, said first set including a respective one of said display segments, each said display segment corresponding to the position of a different one of said recording channels in a slant recorded track on the magnetic tape which shows whether any of said channels are recorded;

a timing signal generator for generating a timing signal to be used for identifying each one of said recording channels a segment of which is currently being scanned, while said multi-PCM recorder scans sequentially said recording tracks;

a signal separation circuit means for separating and reproducing the pilot signal from said superposed PCM data in each of said channels in which said data is recorded;

a first logic circuit means responsive to said reproduced pilot signal and said timing signal for generating indication signals representing which of said recording channels have any of said PCM data already recorded therein; and a drive circuit means for supplying said indication signals to said first set of display segments to indicate on said display device which ones of said recording channels have any of said PCM data recorded therein.

* * * * *